United States Patent
Liu

(10) Patent No.: US 10,281,751 B2
(45) Date of Patent: May 7, 2019

(54) LIQUID CRYSTAL DROPPING APPARATUS AND HEATING THERMOS DEVICE

(71) Applicants: HKC Corporation Limited, Shenzhen (CN); Chongqing HKC Optoelectronics Technology Co., ltd., Chongqing (CN)

(72) Inventor: Gang Liu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/871,437

(22) Filed: Jan. 15, 2018

(65) Prior Publication Data

US 2019/0072789 A1 Mar. 7, 2019

Related U.S. Application Data

(63) Continuation of application No. PCT/CN2017/107257, filed on Oct. 23, 2017.

(30) Foreign Application Priority Data

Sep. 6, 2017 (CN) .......................... 2017 1 0797522

(51) Int. Cl.
*G02F 1/13* (2006.01)
*B05C 5/00* (2006.01)
*G02F 1/1341* (2006.01)

(52) U.S. Cl.
CPC ............ *G02F 1/1303* (2013.01); *B05C 5/001* (2013.01); *G02F 1/1341* (2013.01); *G02F 2001/13415* (2013.01)

(58) Field of Classification Search
CPC ................. G02F 1/1303; G02F 1/1341; G02F 2001/13415; B05C 5/001
USPC ......................... 222/540, 146.1, 146.5, 146.2
See application file for complete search history.

(56) References Cited

U.S. PATENT DOCUMENTS

| | | | | | |
|---|---|---|---|---|---|
| 2,433,554 | A | * | 12/1947 | Herzog | G01V 5/04 250/261 |
| 3,538,381 | A | * | 11/1970 | Cuttino | H02H 6/00 361/103 |
| 2004/0149834 | A1 | * | 8/2004 | Shimoda | H01L 51/0005 239/135 |

(Continued)

FOREIGN PATENT DOCUMENTS

KR 2002-0085199 * 11/2002

*Primary Examiner* — Lien Ngo
(74) *Attorney, Agent, or Firm* — WPAT, PC

(57) ABSTRACT

A liquid crystal dropping apparatus and a heating thermos device are provided. The liquid crystal dropping apparatus includes a heating member configured to heat a liquid crystal in the liquid crystal dropping apparatus, a detecting member, configured to detect a temperature of the liquid crystal in the liquid crystal dropping apparatus, and a control unit respectively connected to the heating member and the detecting member. The control unit controls the heating member according to the temperature detected by the detecting member to keep the temperature of the liquid crystal in the liquid crystal dropping apparatus being a predetermined temperature value.

16 Claims, 2 Drawing Sheets

(56) References Cited

U.S. PATENT DOCUMENTS

| | | | | |
|---|---|---|---|---|
| 2005/0008766 A1* | 1/2005 | Sakurada | ............... | G02F 1/1341 |
| | | | | 427/64 |
| 2005/0053725 A1* | 3/2005 | Iwata | .................... | G02F 1/1341 |
| | | | | 427/375 |
| 2012/0048843 A1* | 3/2012 | Feng | ..................... | A47J 27/004 |
| | | | | 219/442 |
| 2012/0305596 A1* | 12/2012 | Lee | ........................ | G02F 1/1303 |
| | | | | 222/146.1 |

* cited by examiner

LIQUID CRYSTAL DROPPING APPARATUS AND HEATING THERMOS DEVICE

FIELD OF THE DISCLOSURE

The disclosure relates to the technical field of manufacturing a liquid crystal display panel, and particularly to a liquid crystal dropping apparatus and a heating thermos device.

BACKGROUND

A liquid crystal display panel is a dominant material to determine brightness, contrast ratio, color and viewing angle of a liquid crystal display device. The quality and the technology of the liquid crystal display panel relate to the performance of the liquid crystal display device.

The liquid crystal in a liquid crystal display panel is an important parameter of the liquid crystal display panel. The liquid crystal in a liquid crystal display panel is dropped by a liquid crystal dropping apparatus, but the precision of the conventional liquid crystal dropping apparatus is not high and consequently the amount of the liquid crystal in a liquid crystal display panel is hard to keep constant, and the quality of the liquid crystal display panel is uneven.

Therefore, a liquid crystal dropping apparatus with high precision is needed to solve the existing problem.

SUMMARY

A technical problem to be solved by the disclosure is to improve the precision of the liquid crystal dropping apparatus.

To achieve the above object, according to one aspect, the embodiment of the disclosure provides a liquid crystal dropping apparatus. The liquid crystal dropping apparatus includes a liquid crystal jar, a liquid crystal dropping nozzle, a liquid crystal pipeline connected to the liquid crystal jar and the liquid crystal dropping nozzle, and a heating thermos device. The heating thermos device includes a heating member configured to heat a liquid crystal in the liquid crystal dropping apparatus, a detecting member, configured to detect a temperature of the liquid crystal in the liquid crystal dropping apparatus, and a control unit respectively connected to the heating member and the detecting member. The control unit controls the heating member according to the temperature detected by the detecting member to keep the temperature of the liquid crystal in the liquid crystal dropping apparatus being a predetermined temperature value.

According to another aspect, the embodiment of the disclosure provides a heating thermos device used for a liquid crystal dropping apparatus. The liquid crystal dropping apparatus includes a liquid crystal jar, a liquid crystal dropping nozzle, and a liquid crystal pipeline connected to the liquid crystal jar and the liquid crystal dropping nozzle. The heating thermos device includes a heating member configured to heat a liquid crystal in the liquid crystal dropping apparatus, a detecting member, configured to detect a temperature of the liquid crystal in the liquid crystal dropping apparatus, and a control unit respectively connected to the heating member and the detecting member. The heating member includes a first heating case disposed on the liquid crystal jar, a second heating case disposed on the liquid crystal pipeline, and a third heating case disposed on the liquid crystal dropping nozzle. The control unit controls the heating member according to the temperature detected by the detecting member to keep the temperature of the liquid crystal in the liquid crystal dropping apparatus being a predetermined temperature value.

Furthermore, according to another aspect, the embodiment of the disclosure provides a liquid crystal dropping apparatus. The liquid crystal dropping apparatus includes a liquid crystal jar, a liquid crystal dropping nozzle, a liquid crystal pipeline connected to the liquid crystal jar and the liquid crystal dropping nozzle, and a heating thermos device. The heating thermos device includes a heating member configured to heat a liquid crystal in the liquid crystal dropping apparatus, a detecting member, configured to detect a temperature of the liquid crystal in the liquid crystal dropping apparatus, and a control unit respectively connected to the heating member and the detecting member. The control unit controls the heating member according to the temperature detected by the detecting member to keep the temperature of the liquid crystal in the liquid crystal dropping apparatus being a predetermined temperature value, wherein the heating member includes a first heating case disposed on the liquid crystal jar, a second heating case disposed on the liquid crystal pipeline, and a third heating case disposed on the liquid crystal dropping nozzle. Each of the first heating case, the second heating case, and the third heating case includes a heat conducting layer made of a heat conducting material, a thermal insulating layer made of a thermal insulating material and disposed outside the heat conducting layer, and a heating element, disposed in the heat conducting layer. The detecting member includes a mounting rod disposed in the liquid crystal jar via an end of the mounting rod passing through a detecting hole formed on the liquid crystal jar, and a temperature probe disposed under a surface the liquid crystal via disposed on the end of the mounting rod. The control unit includes a control chip, and a modulating switch. The modulating switch includes an input terminal, an output terminal, and a control terminal. The input terminal is connected to a power output unit, the output terminal is respectively connected to the heating element of the first heating case, the heating element of the second heating case, and the heating element of the third heating case, and the control terminal is connected to the control chip, wherein the temperature probe is connected to the control chip and controlled by the control chip.

By applying the technical solution according to the embodiment of the disclosure, the control unit controls the heating member according to the temperature of the liquid crystal to keep the temperature of the liquid crystal. The density and the fluency of the liquid crystal could be stable, so the precision of the liquid crystal dropping apparatus could be improved.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
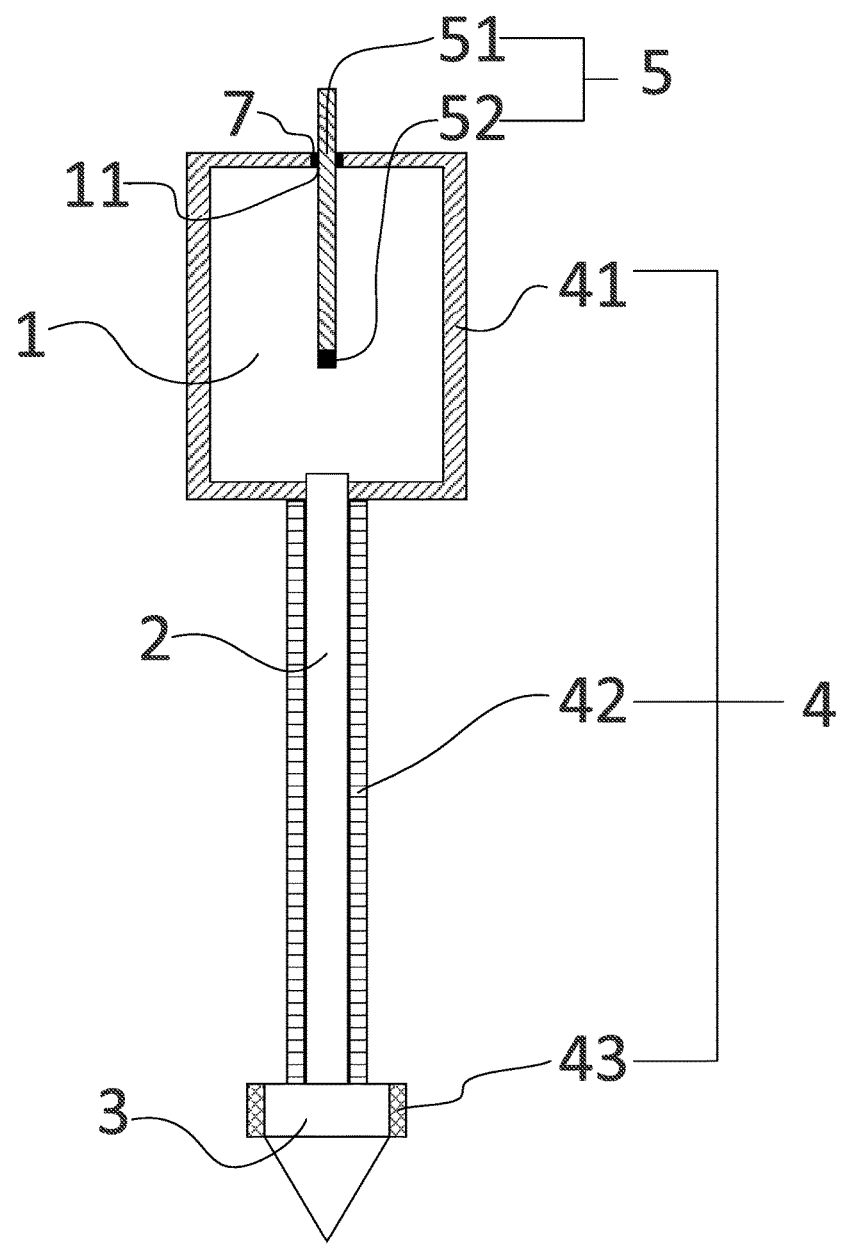
FIG. 1 is a structural schematic view of a liquid crystal dropping apparatus according to an embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Figure 2:
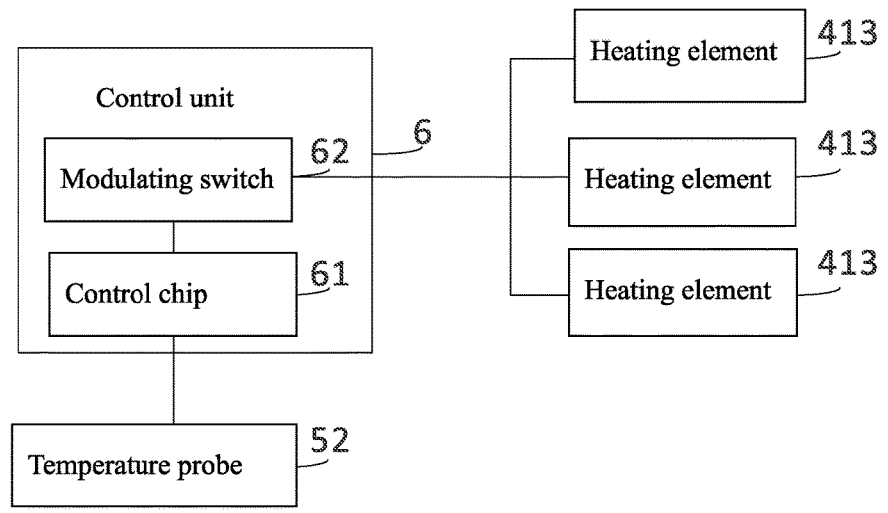
FIG. 2 is a schematic block diagram of a liquid crystal dropping apparatus according to an embodiment of the disclosure.

Referring to FIG. 1 and FIG. 2, the embodiment of the disclosure provides a liquid crystal dropping apparatus. As shown in FIG. 1 and FIG. 2, the liquid crystal dropping apparatus includes a heating thermos device. The heating thermos device includes a heating member 4, a detecting member 5, and a control unit 6. The heating member 4 is configured to heat the liquid crystal in the liquid crystal dropping apparatus. The detecting member 5 is configured to detect a temperature of the liquid crystal in the liquid crystal dropping apparatus. The control unit 6 is respectively connected to the heating member 4 and the detecting member 5. The control unit 6 is used for controlling the heating member 4 according to the temperature detected by the detecting member 5 to keep the temperature of the liquid crystal in the liquid crystal dropping apparatus being a predetermined temperature value, wherein the predetermined temperature value could be set up by user.

The density and the fluency of the liquid crystal are influenced by the temperature, the density and the fluency of the liquid crystal at different temperatures are different. Therefore, if the temperatures of the liquid crystal are different, the amount of the liquid crystal at each transportation is hard to be consistent, so the precision of the liquid crystal dropping apparatus cannot be keep.

The liquid crystal dropping apparatus provided by the embodiment of the disclosure could keep the temperature stable by the control unit 6 controls the heating member 4 according to the temperature of the liquid crystal. The density and the fluency of the liquid crystal could be stable, so the precision of the liquid crystal dropping apparatus could be improved.

Figure 3:
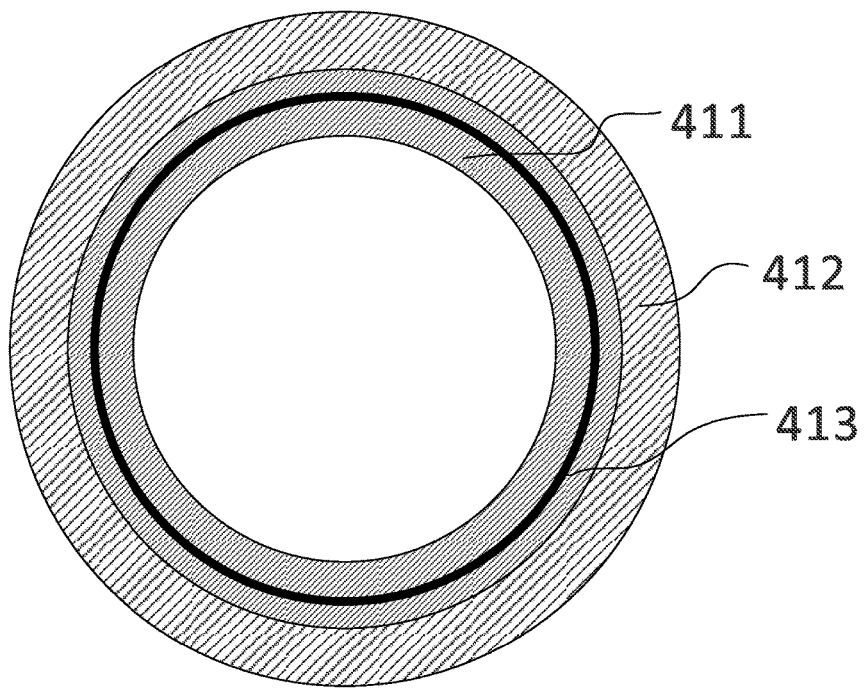
FIG. 3 is a structural schematic view of the heating case in FIG. 1 (including the first heating case, the second heating case, and the third heating case).

Referring to FIG. 1 and FIG. 3, in some embodiments, as shown in this embodiment, the liquid crystal dropping apparatus includes a liquid crystal jar 1, a liquid crystal dropping nozzle 3, a liquid crystal pipeline 2 connected to the liquid crystal jar 1 and the liquid crystal dropping nozzle 3. The liquid crystal jar 1 is a container used for storing the liquid crystal. The liquid crystal jar 1, the liquid crystal pipeline 2, and the liquid crystal dropping nozzle 3 are sequentially connected. Specifically, an end of the liquid crystal pipeline 2 is connected to the liquid crystal jar 1, and another of the liquid crystal pipeline 2 is connected to the liquid crystal dropping nozzle 3 in order to transport the liquid crystal in the liquid crystal jar 1 to the liquid crystal dropping nozzle 3. The liquid crystal dropping nozzle 3 is used for dropping the liquid crystal to the liquid crystal display panel in a fixed amount.

The heating member 4 includes a first heating case 41, a second heating case 42, and a third heating case 43. The length and the opening size of the first heating case 41 match the liquid crystal jar 1, and disposed on the liquid crystal jar 1. The length and the opening size of the second heating case 42 match the liquid crystal pipeline 2, and disposed on the liquid crystal pipeline 2. The length and the opening size of the third heating case 43 match the liquid crystal dropping nozzle 3, and disposed on the liquid crystal dropping nozzle 3.

Furthermore, each of the first heating case 41, the second heating case 42, and the third heating case 43 includes a heat conducting layer 411 made of a heat conducting material disposed inside, a thermal insulating layer 412 made of a thermal insulating material and disposed outside the heat conducting layer, and a heating element 413 disposed in the heat conducting layer 411. The inner layer of the heating case is made of the heat conducting material, so the heat generated by the heating element 413 could transport to the liquid crystal quickly. Meanwhile, the outer layer of the heating case is made of the thermal insulating material in order to preserve the heat, so the consumption of the energy could be decreased.

The heating element 413 may be a heating wire or other heating material, but not limited to, and the heating wire uniformly wound in the heat conducting layer 411. The heating wire uniformly wound in the heat conducting layer 411 in order to heat uniformly, so the uneven temperature could be avoided.

Referring to FIG. 1, the liquid crystal jar 1 has a detecting hole 11. The detecting member 5 includes a mounting rod 51 and a temperature probe 52 disposed on an end of the mounting rod 51. The end of the mounting rod 51 is disposed in the detecting hole 11, so the temperature probe 52 is under the surface the liquid crystal. In this way, the temperature of the liquid crystal detected by the temperature probe 52 is more accurate.

Furthermore, the liquid crystal dropping apparatus further includes a sealing ring 7, the sealing ring is disposed in a gap between the detecting hole 11 and the mounting rod 51 in order to ensure the sealability of the liquid crystal jar 1, so the leakage of the liquid crystal and the entering of the impurity could be effectively prevented.

Referring to FIG. 1 and FIG. 2, in some embodiments, as shown in this embodiment, the control unit 6 includes a control chip 61 and a modulating switch 62. The modulating switch 62 includes an input terminal, an output terminal, and a control terminal. The input terminal of the modulating switch 62 is connected to a power output unit. The output terminal of the modulating switch 62 is respectively connected to the heating element of the first heating case 41, the heating element of the second heating case 42, and the heating element of the third heating case 43. The control terminal of the modulating switch 62 is connected to the control chip 61, and controlled by the control chip 61. The modulating switch 62 may be a switch tube. Selectively, the modulating switch 62 may be a triode. In other embodiment, the modulating switch 62 may be a MOS tube. Selectively, the control chip 61 may be a single-chip microcomputer. In other embodiment, the control chip 61 may be other programmable chip.

Moreover, the control chip 61 is connected to the temperature probe 52, and the temperature probe 52 is controlled by the control chip 61. The temperature probe 52 transmit the temperature of the liquid crystal to the control chip 61 in real time.

Furthermore, the control chip 61 is used for controlling the control terminal to turn on and each of the heating element 413 (the heating element 413 of the first heating case, the second heating case, and the third heating case) to heat and the temperature of the liquid crystal will rise when the temperature of the liquid crystal detected by the temperature probe 52 is lower than the predetermined temperature value. The control chip 61 controls the control terminal to turn off and each of the heating element 413 (the heating element 413 of the first heating case, the second heating case, and the third heating case) to stop heating and the temperature of the liquid crystal will drop when the temperature of the liquid crystal detected by the temperature probe 52 is not lower than the predetermined temperature value. In this way, the temperature of the liquid crystal could be kept at the predetermined temperature value.

Referring to FIG. 1 through FIG. 3, the embodiment of the disclosure provides a liquid crystal dropping apparatus. The liquid crystal dropping apparatus includes a liquid crystal jar 1, a liquid crystal pipeline 2, a liquid crystal dropping nozzle 3, a heating member 4, a detecting member 5, and a control unit 6.

The liquid crystal jar 1 is a container used for storing the liquid crystal and has a detecting hole 11. The liquid crystal pipeline 2 is connected to the liquid crystal jar 1 and the liquid crystal dropping nozzle 3 in order to transport the liquid crystal in the liquid crystal jar 1 to the liquid crystal dropping nozzle 3. The liquid crystal dropping nozzle 3 is used for dropping the liquid crystal to the liquid crystal display panel in a fixed amount.

The heating member 4 is configured to heat the liquid crystal in the liquid crystal dropping apparatus. Specifically, the heating member 4 includes a first heating case 41, a second heating case 42, and a third heating case 43. The length and the opening size of the first heating case 41 match the liquid crystal jar 1, and disposed on the liquid crystal jar 1. The length and the opening size of the second heating case 42 match the liquid crystal pipeline 2, and disposed on the liquid crystal pipeline 2. The length and the opening size of the third heating case 43 match the liquid crystal dropping nozzle 3, and disposed on the liquid crystal dropping nozzle 3. Each of the first heating case 41, the second heating case 42, and the third heating case 43 includes a heat conducting layer 411 made of a heat conducting material disposed inside, a thermal insulating layer 412 made of a thermal insulating material and disposed outside the heat conducting layer, and a heating element 413 disposed in the heat conducting layer 411. The inner layer of the heating case is made of the heat conducting material, so the heat generated by the heating element 413 could transport to the liquid crystal quickly. Meanwhile, the outer layer of the heating case is made of the thermal insulating material in order to preserve the heat, so the consumption of the energy could be decreased.

The detecting member 5 is configured to detect a temperature of the liquid crystal in the liquid crystal dropping apparatus. Specifically, the detecting member 5 includes a mounting rod 51 and a temperature probe 52 disposed on an end of the mounting rod 51. The end of the mounting rod 51 is disposed in the detecting hole 11, so the temperature probe 52 is under the surface the liquid crystal. In this way, the temperature of the liquid crystal detected by the temperature probe 52 is more accurate.

The control unit 6 is respectively connected to the heating member 4 and the detecting member 5. The control unit 6 is used for controlling the heating member 4 according to the temperature detected by the detecting member 5 to keep the temperature of the liquid crystal in the liquid crystal dropping apparatus being a predetermined temperature value, wherein the predetermined temperature value could be set up by user. Specifically, the control unit 6 includes a control chip 61 and a modulating switch 62. The modulating switch 62 includes an input terminal, an output terminal, and a control terminal. The input terminal of the modulating switch 62 is connected to a power output unit. The output terminal of the modulating switch 62 is respectively connected to the heating element of the first heating case 41, the heating element of the second heating case 42, and the heating element of the third heating case 43. The control terminal of the modulating switch 62 is connected to the control chip 61, and controlled by the control chip 61. The modulating switch 62 may be a switch tube. Selectively, the modulating switch 62 may be a triode. In other embodiment, the modulating switch 62 may be a MOS tube. Selectively, the control chip 61 may be a single-chip microcomputer. In other embodiment, the control chip 61 may be other programmable chip. Meanwhile, the control chip 61 is connected to the temperature probe 52, and the temperature probe 52 is controlled by the control chip 61. The temperature probe 52 transmit the temperature of the liquid crystal to the control chip 61 in real time.

The embodiment of the disclosure provides the liquid crystal dropping apparatus. The heating cases are disposed on the liquid crystal jar 1, the liquid crystal pipeline 2, the liquid crystal dropping nozzle 3. The temperature probe 52 detecting the temperature of the liquid crystal is disposed in the liquid crystal jar 1. The control chip 61 obtains the temperature of the liquid crystal detected by the temperature probe 52 in real time, and controls each heating case according to the temperature of the liquid crystal. In this way, the temperature of the liquid crystal could keep stable. The density and the fluency of the liquid crystal could be stable, so the precision of the liquid crystal dropping apparatus could be improved.

In various embodiments, the display panel can be a TN (Twisted Nematic) LCD panel, an IPS (In-Plane Switching) LCD panel, a MVA (Multi-domain Vertical Alignment) LCD panel, a curved display panel or other display panel.

The foregoing contents are detailed description of the disclosure in conjunction with specific preferred embodiments and concrete embodiments of the disclosure are not limited to this description. For the person skilled in the art of the disclosure, without departing from the concept of the disclosure, simple deductions or substitutions can be made and should be included in the protection scope of the application.

What is claimed is:

1. A liquid crystal dropping apparatus comprising:
   a liquid crystal jar;
   a liquid crystal dropping nozzle;
   a liquid crystal pipeline, connected between the liquid crystal jar and the liquid crystal dropping nozzle, and thereby the liquid crystal jar, the liquid crystal pipeline and the liquid crystal dropping nozzle being sequentially connected with one another in that order from top to down; and
   a heating thermos device, wherein the heating thermos device comprises:
      a heating member, configured to heat a liquid crystal in the liquid crystal dropping apparatus;
      a detecting member, configured to detect a temperature of the liquid crystal in the liquid crystal dropping apparatus; and
      a control unit, respectively connected to the heating member and the detecting member, and configured for controlling the heating member according to the temperature detected by the detecting member to keep the temperature of the liquid crystal in the liquid crystal dropping apparatus at a predetermined temperature value;
   wherein the heating member comprising a first heating case disposed on the liquid crystal jar, a second heating case disposed on the liquid crystal pipeline, and a third heating case disposed on the liquid crystal dropping nozzle; each of the first heating case, the second heating case and the third heating case comprises a heat conducting layer and a thermal insulating layer from inside to outside, and a heating element embedded in the heat conducting layer;
   wherein the control unit comprises a control chip and a modulating switch, the modulating switch comprising a control terminal connected to the control chip; the control chip is configured for controlling the control terminal to turn on and thereby the heating elements of the first heating case, the second heating case and the third heating case start heating, when the temperature of the liquid crystal detected by the detecting member is lower than the predetermined temperature value; and the control chip is also configured for controlling the control terminal to turn off and thereby the heating elements of the first heating case, the second heating case and the third heating case stop heating, when the temperature of the liquid crystal detected by the detecting member is not lower than the predetermined temperature value.

2. The liquid crystal dropping apparatus according to claim 1, wherein:
   the first heating case matches an outer wall of the liquid crystal jar;
   the second heating case matches an outer wall of the liquid crystal pipeline; and
   the third heating case matches an outer wall of the liquid crystal dropping nozzle.

3. The liquid crystal dropping apparatus according to claim 2, wherein
   the heat conducting layer is made of a heat conducting material,
   the thermal insulating layer is made of a thermal insulating material and disposed outside the heat conducting layer.

4. The liquid crystal dropping apparatus according to claim 3, wherein the heating element comprises a heating wire, and the heating wire is uniformly wound in the heat conducting layer.

5. The liquid crystal dropping apparatus according to claim 3, wherein the detecting member comprises:
   a mounting rod, disposed in the liquid crystal jar via an end of the mounting rod passing through a detecting hole formed on the liquid crystal jar; and
   a temperature probe, disposed under a surface of the liquid crystal via disposed on the end of the mounting rod.

6. The liquid crystal dropping apparatus according to claim 5, wherein the liquid crystal dropping apparatus further comprises a sealing ring, and the sealing ring is disposed in a gap between the detecting hole and the mounting rod.

7. The liquid crystal dropping apparatus according to claim 5, wherein
   the modulating switch further comprises an input terminal and an output terminal, the input terminal is connected to a power output unit, the output terminal is respectively connected to the heating element of the first heating case, the heating element of the second heating case, and the heating element of the third heating case.

8. The liquid crystal dropping apparatus according to claim 7, wherein the temperature probe is connected to the control chip and controlled by the control chip.

9. The liquid crystal dropping apparatus according to claim 7, wherein the control chip comprises a single-chip microcomputer.

10. A heating thermos device, used for a liquid crystal dropping apparatus, the liquid crystal dropping apparatus comprising a liquid crystal jar, a liquid crystal dropping nozzle, and a liquid crystal pipeline connected between the liquid crystal jar and the liquid crystal dropping nozzle, and the heating thermos device comprising:
   a heating member, configured to heat a liquid crystal in the liquid crystal dropping apparatus, wherein the heating member comprises a first heating case disposed on the liquid crystal jar, a second heating case disposed on the liquid crystal pipeline, and a third heating case disposed on the liquid crystal dropping nozzle;
   a detecting member, configured to detect a temperature of the liquid crystal in the liquid crystal dropping apparatus; and
   a control unit, respectively connected to the heating member and the detecting member, and configured for controlling the heating member according to the temperature detected by the detecting member to keep the temperature of the liquid crystal in the liquid crystal dropping apparatus at a predetermined temperature value;

wherein each of the first heating case, the second heating case and the third heating case comprises a respective heating element;

wherein the control unit comprises a control chip and a modulating switch; the modulating switch comprises an input terminal, an output terminal, and a control terminal; the input terminal is connected to a power output unit; the output terminal is connected to the heating element of the first heating case, the heating element of the second heating case, and the heating element of the third heating case, respectively; and the control terminal is connected to the control chip;

wherein the detecting member comprises a temperature probe disposed in the liquid crystal jar, and the temperature probe is connected to the control chip and is controlled by the control chip;

wherein the control chip controls the control terminal to turn on and then the heating elements of the first heating case, the second heating case and the third heating case start to heat up the liquid crystal through the output terminal, when the temperature of the liquid crystal detected by the temperature probe is lower than the predetermined temperature value;

wherein the control chip controls the control terminal to turn off and then the heating elements of the first heating case, the second heating case and the third heating case stop heating through the output terminal, when the temperature of the liquid crystal detected by the temperature probe is not lower than the predetermined temperature value.

11. The heating thermos device according to claim 10, wherein each of the first heating case, the second heating case, and the third heating case further comprises:
a heat conducting layer made of a heat conducting material, and
a thermal insulating layer, made of a thermal insulating material and disposed outside the heat conducting layer;
wherein the heating element is disposed in the heat conducting layer.

12. The heating thermos device according to claim 11, wherein the heating element comprises a heating wire, and the heating wire is uniformly wound and embedded in the heat conducting layer.

13. The heating thermos device according to claim 11, wherein the detecting member further comprises:
a mounting rod, disposed in the liquid crystal jar via an end of the mounting rod passing through a detecting hole formed on the liquid crystal jar;
wherein the temperature probe is disposed under a surface the liquid crystal via disposed on the end of the mounting rod.

14. The heating thermos device according to claim 10, wherein the control chip comprises a single-chip microcomputer.

15. The heating thermos device according to claim 10, wherein the modulating switch comprises a switch tube.

16. A liquid crystal dropping apparatus, comprising:
a liquid crystal jar;
a liquid crystal dropping nozzle;
a liquid crystal pipeline, connected between the liquid crystal jar and the liquid crystal dropping nozzle; and
a heating thermos device, wherein the heating thermos device comprises:
a heating member, configured to heat a liquid crystal in the liquid crystal dropping apparatus;
a detecting member, configured to detect a temperature of the liquid crystal in the liquid crystal dropping apparatus; and
a control unit, respectively connected to the heating member and the detecting member, and controlling the heating member according to the temperature detected by the detecting member to keep the temperature of the liquid crystal in the liquid crystal dropping apparatus being a predetermined temperature value,
wherein the heating member comprises:
a first heating case, disposed on the liquid crystal jar;
a second heating case, disposed on the liquid crystal pipeline; and
a third heating case, disposed on the liquid crystal dropping nozzle, wherein each of the first heating case, the second heating case, and the third heating case comprises a heat conducting layer made of a heat conducting material, a thermal insulating layer made of a thermal insulating material and disposed outside the heat conducting layer, and a heating element disposed in the heat conducting layer;
wherein the detecting member comprises:
a mounting rod, disposed in the liquid crystal jar via an end of the mounting rod passing through a detecting hole formed on the liquid crystal jar; and
a temperature probe, disposed under a surface of the liquid crystal via disposed on the end of the mounting rod;
wherein the control unit comprises:
a control chip; and
a modulating switch, comprising an input terminal, an output terminal, and a control terminal, the input terminal connected to a power output unit, the output terminal respectively connected to the heating element of the first heating case, the heating element of the second heating case, and the heating element of the third heating case, and the control terminal connected to the control chip;
wherein the temperature probe is connected to the control chip and controlled by the control chip;
wherein the heating element comprises a heating wire, and the heating wire is uniformly wound and embedded in the heat conducting layer;
wherein the control chip is configured for controlling the control terminal to turn on and then the heating elements of the first heating case, the second heating case and the third heating case start to heat up the liquid crystal through the output terminal, when the temperature of the liquid crystal detected by the temperature probe is lower than the predetermined temperature value;
wherein the control chip is also configured for controlling the control terminal to turn off and then the heating elements of the first heating case, the second heating case and the third heating case stop heating through the output terminal, when the temperature of the liquid crystal detected by the temperature probe is not lower than the predetermined temperature value.

* * * * *